Figure 1:
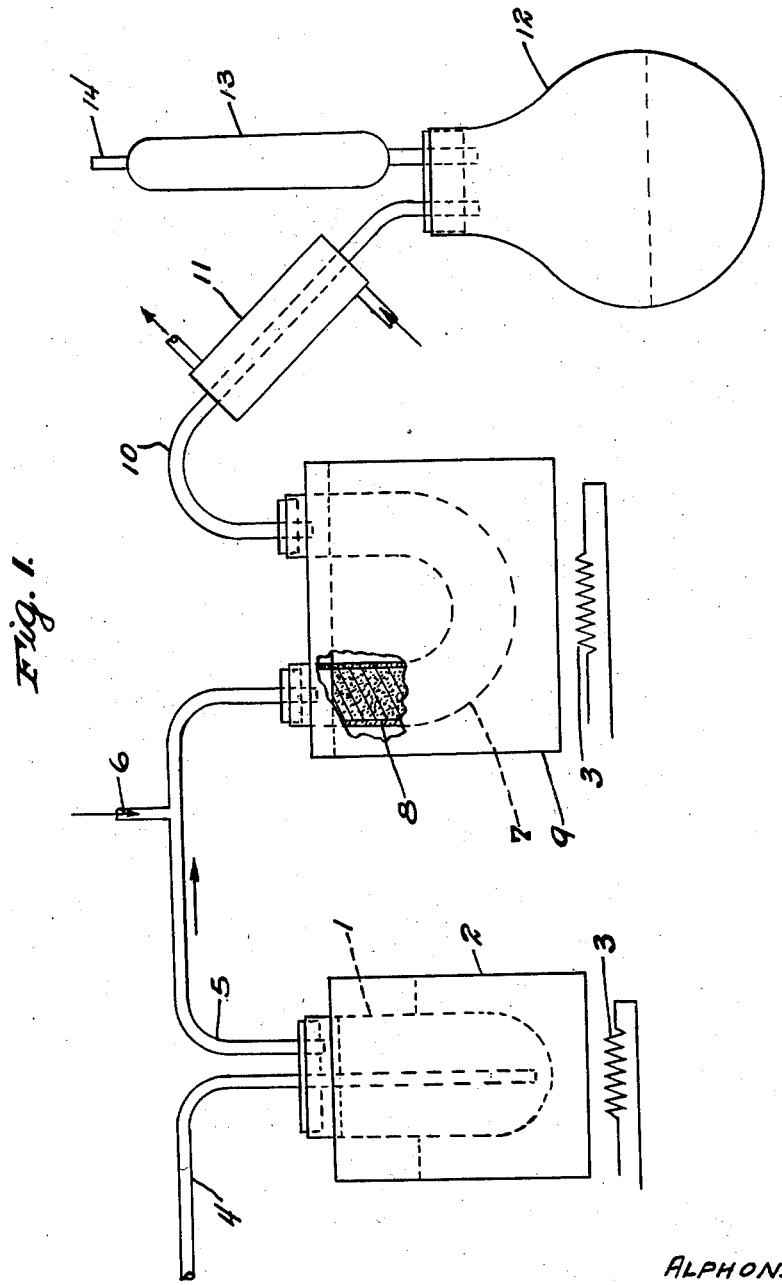

Dec. 2, 1947.  A. PECHUKAS  2,431,823
MANUFACTURING THIONYL CHLORIDE
Filed Feb. 16, 1946  2 Sheets-Sheet 1

INVENTOR.
ALPHONSE PECHUKAS
BY
Olen E. Bee
ATTORNEY.

Dec. 2, 1947. A. PECHUKAS 2,431,823
MANUFACTURING THIONYL CHLORIDE
Filed Feb. 16, 1946 2 Sheets—Sheet 2

INVENTOR.
ALPHONSE PECHUKAS
BY
Olen E. Bee
ATTORNEY.

Patented Dec. 2, 1947

2,431,823

UNITED STATES PATENT OFFICE 2,431,823

MANUFACTURING THIONYL CHLORIDE

Alphonse Pechukas, Akron, Ohio, assignor to Pittsburgh Plate Glass Company, Allegheny County, Pa., a corporation of Pennsylvania Application February 16, 1946, Serial No. 648,152

6 Claims. (Cl. 23—203)

This invention relates to manufacturing thionyl chloride, $SOCl_2$, and more particularly to a process of manufacturing thionyl chloride from a sulfur chloride by directly reacting sulfur dioxide and chlorine therewith.

Among the objects of my invention is the provision of an efficient and economical process of preparing thionyl chloride from readily available and inexpensive raw materials.

A further object of the invention is the provision of such a process wherein the main reaction results in a crude reaction product which is predominantly thionyl chloride and in which the by-products and unconverted reactants are such that they can be easily removed, recovered and reused as additional charging stock.

Other objects and advantages of the invention will be apparent from consideration of the following description of the invention and certain specific embodiments thereof.

Thionyl chloride is a well-known laboratory reagent. However, its utilization in commercial operations has been restricted because of its high cost and lack of large scale production facilities.

The preparation of thionyl chloride by treating dry sulfur dioxide with phosphorous pentachloride is well-known, but the reaction product is contaminated with undesirable phosphorous compounds, the elimination of which is attended by considerable difficulty and expense. Thionyl chloride is also obtained by the action of chlorine monoxide upon sulfur at temperatures below 0° C. This process has not been adopted commercially because it is extremely difficult to control and involves the handling of an explosive mixture which is easily detonated. In U. S. Patent No. 1,861,900 there is disclosed yet another process based on the following reaction conducted in the presence of a mercuric chloride catalyst:

$$2H_2SO_4+3SCl_2+Cl_2=2SOCl_2+3SO_2+4HCl$$

The end products of the reaction are easily separated, but the process is uneconomical because the by-products, sulfur dioxide and hydrogen chloride, predominate and cannot be reused in the reaction. As commercially offered, the thionyl chloride produced by the foregoing process is contaminated with sulfuryl chloride.

According to the present invention a sulfur chloride is converted to thionyl chloride by reaction with sulfur dioxide and chlorine, presumably according to one of the following equations:

(1) 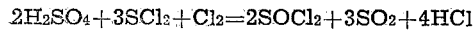$S_2Cl_2+2SO_2+3Cl_2\rightleftarrows 4SOCl_2$
(2) $SCl_2+SO_2+Cl_2\rightleftarrows 2SOCl_2$ The reactants are contacted in the presence of a catalyst, preferably activated carbon, and conditions are controlled so that the temperature in the reaction zone is at least high enough to prevent formation of sulfuryl chloride ($SO_2Cl_2$).

Appreciable conversion of the sulfur chloride takes place at temperatures between 150° C. and 400° C. Although these temperatures do not define critical limits beyond which no conversion takes place, nevertheless lower or higher temperatures do not facilitate significant yields. The temperature is always maintained above 100° C. to prevent formation of $SO_2Cl_2$.

The reactions involved are reversible and, accordingly, I prefer to adjust the temperature of the reactants while in contact with the catalyst mass to afford the presence of the maximum possible amount of undissociated thionyl chloride at the completion of the reaction. Where the reaction zone is maintained at approximately uniform temperature throughout, I have discovered that optimum yields are obtained when the temperature of the reaction zone is maintained at about 200° C.

The reaction is exothermic. In large scale operations, where the gaseous reactants are passed through a catalyst bed of appreciable cross section, it is convenient to allow the temperature to rise considerably above 200° C. at the outset while controlling the ultimate temperature of the reactants before leaving the reaction zone to insure that they are at a temperature of 200° C. or below prior to removal and recovery.

The conversion of a sulfur chloride to thionyl chloride in accordance with the invention may be conducted batchwise or continuously.

Under the conditions prevailing in the reaction zone, it is not entirely clear which chloride of sulfur is principally involved in the reaction with chlorine and $SO_2$. However, this fact is immaterial to the successful practice of the invention. At the temperatures required to obtain good yields of thionyl chloride, sulfur, chlorine and two chlorides of sulfur are all present in the zone as indicated by the equilibrium reactions:

(3) $S_2Cl_2\rightleftarrows 2S+Cl_2$
(4) $2SCl_2\rightleftarrows S_2Cl_2+Cl_2$ Thus, all that is necessary is for the S—$SO_2$—$Cl_2$ proportion to be balanced adequately for efficient conversion to take place.

I find it expedient to maintain an excess of $SO_2$, $Cl_2$ or both in the feed to the reactor.

Inasmuch as sulphuryl chloride, $SO_2Cl_2$, dissociates completely to $SO_2$ and $Cl_2$ at temperatures over 100° C., one may use $SO_2Cl_2$ to supply part of the requirements. By the same token, the lower temperature limit of useful conversion conditions is slightly above the temperature (100° C.)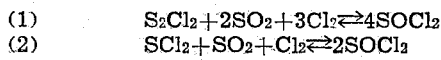

at which $SO_2$ and $Cl_2$ will associate to form $SO_2Cl_2$.

Considerable variation is possible in the manner of introducing the charge so as to bring about contact of the necessary reactants in the presence of the catalyst. For instance, I have charged a liquid mixture of equimolecular amounts of sulfuryl chloride and sulfur dichloride together with an excess of chlorine to a hot catalyst bed maintained at 200° C., and have obtained thionyl chloride in the effluent from the bed. Yields are low and control of the charge is difficult because of surging upon sudden evaporation of the liquid.

Preferably, the sulfur monochloride or dichloride is preheated and vaporized before introduction to the reactor. This can be facilitated by using chlorine as a vaporization aid, bubbling it through the hot liquid sulfur chloride and passing the emanating vapors to the hot reaction zone.

Regardless of the particular sulfur chloride charged to the reaction zone, the crude reaction product recovered therefrom contains appreciable quantities of both sulfur chlorides in addition to unreacted $SO_2$ and $Cl_2$. This is inevitable in view of the association of sulfur and chlorine in the system under the conditions prevailing. Hence, a typical crude reaction product resulting from a single pass conversion of sulfur monochloride after removal of unreacted $SO_2$ and $Cl_2$ may contain something over fifty per cent thionyl chloride with the balance containing equal proportions of the mono- and di-chlorides of sulfur. Again, a similar reaction product may contain a preponderance of one chloride over the other, but there is always an appreciable amount of each.

Ordinarily, the effluent from the reaction zone is conducted through a water cooled condenser and hence to a separator or degasser where $SO_2$ and $Cl_2$ are removed as gases, leaving a liquid residue which consists practically entirely of thionyl chloride and the mono- and di-chlorides of sulfur. The liquid residue is marked by complete freedom from contamination with sulfuryl chloride which distinguishes it from certain other commercial products.

The relative proportion of $SO_2$ and $Cl_2$ in the off gas depends on the feed and the conditions prevailing in the system, but in all events after analysis the mixed gases can be recycled to the feed with sufficient make-up either component to establish the required balance in the feed.

Under some conditions, it is convenient for metering purposes to pass the off gases over cold activated charcoal to convert the minor component entirely to sulfuryl chloride, a liquid. If desired, the deficiency in the minor component can be augmented by make-up so that the two reactants pass over the cold charcoal in equimolecular proportions and are entirely converted to sulfuryl chloride. In either event, the sulfuryl chloride can be used as such or heated to dissociate it prior to the recycle feed back, inasmuch as the $SO_2$ and $Cl_2$ content of the liquid is readily determinable.

The liquid residue after removal of $SO_2$ and $Cl_2$ is topped to remove a fraction containing principally sulfur dichloride which can be recycled to the feed. The bottoms are then distilled in a column under vacuum to separate an overhead fraction containing ninety-five per cent or more thionyl chloride.

Advantageously, after removal of the off gases, the liquid residue from the condenser is subjected to a purification operation involving addition of sulfur and an iron-containing catalyst thereto followed by distillation. This purification operation is a separate invention described and claimed in the co-pending application of Fred C. Trager, Serial No. 648,151 entitled Purification of thionyl chloride, and filed concurrently herewith.

As therein described, on addition of flowers of sulfur and an iron-containing catalyst to the crude liquid reaction product, followed by distillation, the sulfur chlorides which contaminate the thionyl chloride are left behind as sulfur monochloride. In the distillation step, purified thionyl chloride is removed overhead, and recovered as a distillate. Water-white thionyl chloride of over 99.0 per cent purity is obtainable by this method.

Employing the aforesaid purification operation in the practice of the present invention, the bottoms remaining after separation of thionyl chloride can be returned to the feed after chlorination to the desired chlorine-sulfur ratio.

In the accompanying drawings, wherein certain specific embodiments of the invention are illustrated in diagrammatic fashion;

Fig. I is a schematic representation of certain laboratory apparatus employed in practicing the invention; and Fig. II is a flow sheet depicting the relationship of the various steps in the process of the invention and showing certain modifications thereof.

Referring to the drawing and more particularly to Fig. I thereof, a stoppered flask 1 is suspended in a wax bath 2 heated by a flame or other source of heat 3. An inlet tube 4 projects through the stopper and terminates at a low level in flask 1. Outlet 5 projects through the stopper into the flask to a point well above the liquid level therein. Outlet 5 after junction with tube 6 leads into one end of a conventional stoppered U-tube reactor 7 nearly filled with a body of finely divided activated charcoal 8 and suspended in a wax bath 9, heated as at 3. From the other end of U-tube 7, a conduit 10 leads through a water-jacketed condenser 11 into a stoppered receiving flask 12. A conventional column 13, preferably packed with Pyrex glass spirals communicates at its base with flask 12 and serves to trap uncondensed vapors proceeding toward gas take off 14.

In a typical operation, flask 1 is nearly filled with a body of sulfur monochloride and the wax in bath 2 is heated to a temperature substantially in excess of 59° C., but below the boiling point of sulfur dichloride, say 120° C. Chlorine gas is then introduced through inlet 4 at such a rate that sulfur dichloride is continuously formed and vaporized in the flask 1. Vapors of $SCl_2$ together with any excess $Cl_2$ and some vapors of sulfur monochloride emanating from flask 1 are removed through outlet 5. Sulfur dioxide and additional chlorine are introduced into the stream via tube 6 and the mixed vapors proceed to the inlet side of U-tube 7. The wax bath 9 is maintained at a temperature of about 200° C. After passing through hot charcoal bed 8, the reaction products are withdrawn through conduit 10 and subjected to cooling in condenser 11 from whence the products pass to receiver 12. Chlorides of sulfur and thionyl chloride remain in the flask, unreacted chlorine $SO_2$ being separated and removed as off gases through outlet 14.

In the following tables there are presented the results of a series of experimental runs in which the apparatus employed corresponded with that illustrated in Fig. 1. The tables nicely illustrate how the variation of certain conditions in the process modifies the results.

In these experiments approximately one-third of the chlorine used was introduced through the inlet 4 and the balance, together with the $SO_2$, through tube 6.

TABLE I

| Exp. No. | Time of Run, Min. | $S_2Cl_2$ Bath Temp., °C. | Main Reactor Bath Temp., °C. | Charge in Grams | | | Rate of Chge., Gms./Min. | | Crude $SOCl_2$ Recovery, Gms. |
|---|---|---|---|---|---|---|---|---|---|
| | | | | $S_2Cl_2$ | $SO_2$ | $Cl_2$ | $SO_2$ | $Cl_2$ | |
| 1 | 160 | 70-75 | 250 | 149 | 69 | 61 | 0.43 | .78 | 266 |
| 2 | 120 | 125 | 250 | 149 | 64 | 118 | 0.53 | .98 | 363 |
| 3 | 125 | 125 | 250 | 149 | 134 | 244 | 1.07 | 1.95 | 352 |
| 4 | 110 | 125 | 200 | 149 | 118 | 214 | 1.07 | 1.95 | 366 |
| 5 | 120 | 125 | 150 | 149 | 128 | 234 | 1.07 | 1.95 | 216 |
| 6 | 205 | 125 | 250 | 149 | 109 | 201 | 0.53 | 0.98 | 317 |
| 7 | 205 | 120 | 200 | 149 | 109 | 201 | 0.53 | 0.98 | 349 |
| 8 | 180 | 120 | 175 | 149 | 95 | 176 | 0.53 | 0.98 | 328 |
| 9 | 230 | 115 | 225 | 149 | 122 | 225 | 0.53 | 0.98 | 348 |
| 10 | 205 | 110 | 200 | 135 | 109 | 90 | 0.53 | 0.44 | 232 |
| 11 | 225 | 110 | 200 | 135 | 119 | 200 | 0.53 | 0.89 | 304 |
| 12 | 230 | 110 | 200 | 135 | 156 | 204 | 0.67 | 0.89 | 369 |
| 13 | 505 | 115 | 200 | 270 | 298 | 470 | 0.59 | 0.93 | 745 |
| 14 | 255 | 110 | 200 | 135 | 143 | 237 | 0.56 | 0.93 | 292 |
| 15 | 235 | 110 | 200 | 135 | 188 | 312 | 0.8 | 1.33 | 336 |
| 16 | 255 | 110 | 200 | 135 | 204 | 237 | 0.8 | 0.93 | 361 |
| 17 | 265 | 110 | 200 | 135 | 156 | 246 | 0.59 | 0.93 | 359 |
| 18 | 335 | 115 | 200 | 135 | 358 | 298 | 1.07 | 0.89 | 371 |
| 19 | 260 | 125 | 200 | 135 | 278 | 231 | 1.07 | 0.89 | 379 |
| 20 | 260 | 125 | 200 | 135 | 208 | 231 | 0.8 | 0.89 | 354 |
| 21 | 240 | 130 | 200 | 135 | 257 | 213 | 107 | 0.89 | 351 |
| 22 | 240 | 130 | 225 | 135 | 277 | 238 | 107 | 0.99 | 333 |
| 23 | 250 | 130 | 175 | 135 | 268 | 248 | 107 | 0.99 | 234 |
| 24 | 205 | 130 | 200 | 135 | 240 | 201 | 117 | 0.98 | 355 |
| 25 | 215 | 125 | 200 | 135 | 252 | 211 | 117 | 0.98 | 371 |
| 26 | 245 | 115 | 200 | 135 | 287 | 240 | 117 | 0.98 | 373 |

In analysis of the crude liquid reaction product recovered in receiver 12, a packed column with a distilling head was employed to control reflux rates.

TABLE II

*Product Analysis*

| Exp. No. | Distillation Analysis | | | Per Cent Yield $SOCl_2$ | |
|---|---|---|---|---|---|
| | B. P. to 74° C., Gms. | B. P. 74-76° C. | Still Bottoms | Basis $SO_2$ | Basis $S_2Cl_2$ |
| 1 | | 116.0 | 150 | 45.4 | |
| 2 | | 122 | 146 | 51.3 | |
| 3 | 19.0 | 232 | 101 | 45.4 | |
| 4 | | 260 | 106 | 59.8 | |
| 5 | 25.0 | 62 | 129 | 13.0 | |
| 6 | 5.0 | 196 | 116 | 48.4 | |
| 7 | 13.0 | 237 | 99 | 58.4 | |
| 8 | 12.0 | 182 | 129 | 51.4 | |
| 9 | 14.0 | 261 | 73 | 57.6 | |
| 10 | | 130 | 102 | 32.1 | |
| 11 | | 230 | 74 | 52.0 | |
| 12 | | 303 | 66 | | 63.6 |
| 13 | 11.0 | 598 | 136 | | 63.0 |
| 14 | 3.0 | 230 | 59 | | 48.4 |
| 15 | 5.0 | 260 | 71 | | 54.6 |
| 16 | 4.0 | 321 | 36 | | 67.4 |
| 17 | 5.0 | 300 | 54 | | 63.0 |
| 18 | 5.0 | 334 | 32 | | 70.2 |
| 19 | | 343 | 36 | | 72.1 |
| 20 | | 326 | 28 | | 68.4 |
| 21 | 4.0 | 320 | 27 | | 67.2 |
| 22 | | 303 | 30 | | 63.7 |
| 23 | 32.0 | 174 | 28 | | 37.6 |
| 24 | | 312 | 43 | | 65.5 |
| 25 | | 334 | 37 | | 70.0 |
| 26 | | 337 | 36 | | 70.7 |

The fraction boiling up to 74° C. is principally $SCl_2$; that boiling from 74° to 76° C. is principally thionyl chloride, while the distillation residue is sulfur and sulfur monochloride.

Sulfur was added to the crude liquid before distillation. In the absence of iron the sulfur was dissolved very slowly and separation of the thionyl chloride fraction was difficult. Even where no low boiling fraction was obtained the thionyl chloride fraction was highly colored. In certain of the experiments catalytic amounts of iron were added along with sulfur before distillation of the crude thionyl chloride in accordance with the Trager process described above. In such instances, typified by Experiments Nos. 24, 25 and 26, the dichloride was almost immediately converted to monochloride with evolution of heat. The $SOCl_2$ recovered on distillation was of much lighter color than the fractions obtained in other analyses.

Analyzing the data presented in the tables, it is evident that when the catalyst bed is maintained at a temperature below 175° C. or above 225° C. the yield is poor. Best yields were obtained at 200° C. As far as determinable from the available data, contact time has little or no effect on yields. While the concentration of the reactants can be varied over wide limits without appreciable effect on yields, the data show that a deficiency in chlorine is definitely undesirable. An excess over theoretical amounts of about 100 per cent for $SO_2$ and 0 to 10 per cent for $Cl_2$ appear to be most desirable.

Figure 2:
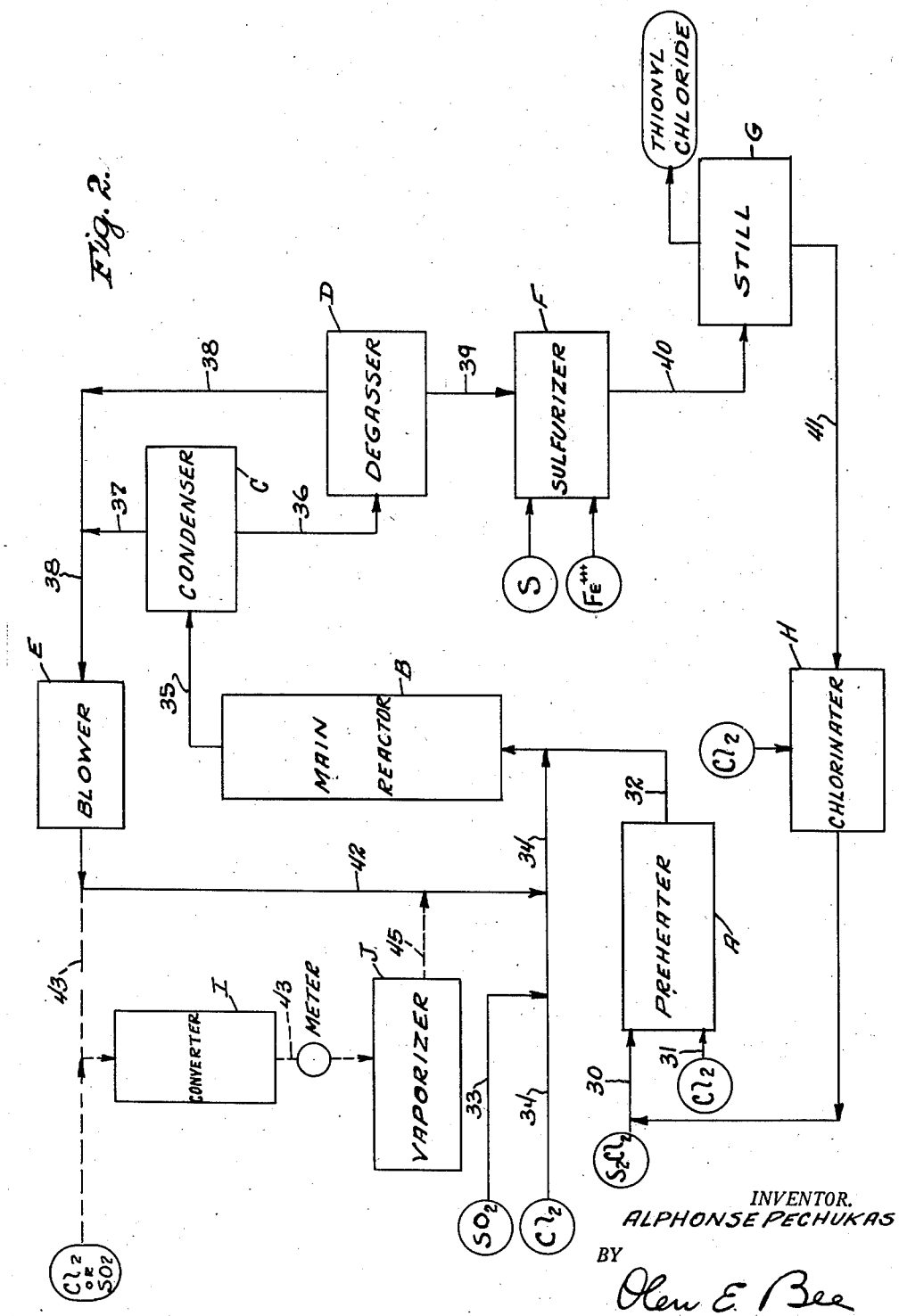

In Fig. 2 there is illustrated diagrammatically a preferred embodiment of the invention wherein the process can be operated continuously with certain optional modifications. In conducting the process of the invention in accordance with the diagram, sulfur monochloride is withdrawn from storage and introduced through line 30 to a preheater A where it is brought to a temperature of approximately 125° C. Chlorine from storage is introduced through line 31 into the preheater A where it serves to form sulfur dichloride which is vaporized and conducted through line 32 toward the main reactor B. Sulfur dioxide and chlorine from storage are introduced into line 32 through lines 33 and 34 respectively just before entry into the main reactor B. In the main reactor the reactants pass in intimate admixture through a bed of activated charcoal or carbon. If desired, the bed can be maintained at uniform temperature throughout by means of conventional controls. In such instances, high yields are favored by maintaining the bed within a temperature range of 175 to 225° C.

Alternatively, once the reaction is initiated the temperature of the forepart of the bed may be permitted to be controlled only by the heat evolved during the initial part of the reaction, while the afterpart of the bed is so controlled that the effluent from the main reactor is at a temperature of 200° C. or slightly below whereby undue dissociation of the thionyl chloride formed is prevented.

From the main reactor, the reaction products are removed through line 35 to a water cooled condenser C where all the thionyl chloride is removed as condensate. The crude condensate is removed through line 36 to a degasser D where dissolved chlorine and SO₂ are removed as vapors and after joining the uncondensed gases removed from the condenser through line 37 they pass to the inlet side of a blower E through conduit 38.

Degassed condensate from the degasser is removed through line 39 to a sulfurizer F where flowers of sulfur are added in amount substantially in excess of that required to convert any SCl₂ to the monochloride together with a catalytic amount of a substance such as FeCl₃ capable of yielding ferric ions. Thence, via line 40 the sulfurized crude product is introduced into a still G where it is heated to remove purified thionyl chloride as an overhead which is condensed and recovered as the main product. The still bottoms, consisting mainly of sulfur monochloride admixed with elemental sulfur are preferably withdrawn through line 41 and passed to a chlorinater 4 where they are chlorinated to any desired degree prior to being recycled to the charge entering the preheater A. SO₂ and chlorine as off gases from the main reaction may be returned to the charge via lines 42, 34 and 32. Alternatively, the off gases may be introduced through line 43 into a converter I where, in the presence of cold charcoal, the SO₂ and chlorine in the off gas (together with such makeup as is necessary to obtain stoichiometric proportions of the two components) combine to form sulfuryl chloride, a liquid. On removal from the converter through line 43 the sulfuryl chloride is readily metered prior to introduction into a vaporizer J where the liquid is vaporized and recycled through line 45 to the stream entering the main reactor. The alternative treatment of the off gases just described is shown in dotted lines in the drawing.

If desired, the chlorinater H may be omitted from the cycle of operations, sulfur and sulfur monochloride from the still G being recycled directly to the preheater A where additional chlorine is supplied to convert elemental sulfur to the chloride.

Under properly controlled conditions, the conversion of sulfur and chlorine (the principal reactants from the viewpoint of economy) to thionyl chloride is nearly 100 per cent efficient.

What I claim is:

1. A process which comprises contacting a sulfur chloride with sulfur dioxide and chlorine in the presence of a catalyst at a temperature above 100° C. and recovering a reaction product containing thionyl chloride.

2. A process which comprises contacting a sulfur chloride with sulfur dioxide and chlorine in the presence of activated carbon and recovering a reaction product containing thionyl chloride.

3. A process which comprises forming a vapor phase mixture of sulfur dichloride, sulfur dioxide and chlorine, passing the mixture through a hot bed of activated carbon, cooling the effluent vapors to separate a liquid fraction containing thionyl chloride and recovering the liquid fraction so formed.

4. A continuous process which comprises heating a body of sulfur monochloride to a temperature above 59° C. and below the boiling point of the monochloride, introducing chlorine and additional sulfur monochloride thereto in order to continuously form and vaporize sulfur dichloride, removing such dichloride vapors in a stream, admixing therewith sulfur dioxide and additional chlorine to form a gaseous stream of charging stock, passing said stream through a hot bed of activated carbon to generate thionyl chloride, removing the gaseous reaction products, condensing therefrom a liquid fraction containing thionyl chloride, separating such fraction, removing uncondensed gases as an overhead and recycling such overhead to said stream of charging stock.

5. A process which comprises vaporizing a chloride of sulfur, admixing therewith sulfur dioxide and chlorine each in excess of the stoichiometric amount required to form thionyl chloride, passing the mixed vapors through a bed of hot activated carbon, controlling the temperature of the bed so that the vapors emerge therefrom at a temperature of approximately 200° C., cooling the effluent from the bed to separate therefrom a liquid fraction containing thionyl chloride and recovering the liquid fraction so formed.

6. A continuous process of manufacturing thionyl chloride which comprises maintaining a body of sulfur monochloride at a temperature substantially in excess of 59° C. but below the boiling point of sulfur monochloride, continuously introducing chlorine gas into said body together with additional sulfur monochloride, continuously removing vapors of sulfur dichloride so formed and bringing them into admixture with gaseous chlorine and sulfur dioxide, passing the mixture through a hot bed of activated carbon under conditions so controlled that the temperature of the effluent from the bed is between 175° C. and 225° C., subjecting the gases after passage through the bed to condensation to separate out a liquid fraction containing thionyl chloride and sulfur chloride, removing unreacted sulfur dioxide and chlorine as an overhead and directing said overhead through a bed of cold activated carbon to form sulfuryl chloride, vaporizing said sulfuryl chloride, recycling said vapors to the mixture passing to the hot carbon bed, distilling said liquid fraction containing thionyl chloride in the presence of an excess of elemental sulfur to separate and recover purified thionyl chloride as a distillate, continuously withdrawing still bottoms containing sulfur monochloride and sulfur, subjecting said still bottoms to chlorination to form sulfur chloride and recycling said sulfur chloride to the feed.

ALPHONSE PECHUKAS.